Dec. 7, 1926.

J. F. WYRILL

FISH LURE

Filed Feb. 25, 1926

1,610,029

INVENTOR
JOHN FREDERICK WYRILL

BY Fetherstonhaugh & Co

ATTORNEYS

Patented Dec. 7, 1926.

1,610,029

UNITED STATES PATENT OFFICE.

JOHN FREDERICK WYRILL, OF TRANQUILLE, BRITISH COLUMBIA, CANADA.

FISH LURE.

Application filed February 25, 1926. Serial No. 90,640.

My invention relates to improvements in fish lures, the objects of which are to provide means whereby a scintillating and an oscillating effect is produced as the lure is drawn through the water, and whereby complete rotation thereof is prevented.

The invention consists essentially of a lure having a central stem adapted to be attached at one end to a line, and at the other end to be fitted with one or more hooks, the stem supporting a sleeve and a plurality of reflectors or discs at different angles to the axis of the stem, as will be more fully described in the following specification, in which:—

In the drawings like characters of reference indicate corresponding parts in each figure.

Figures 1, 2:
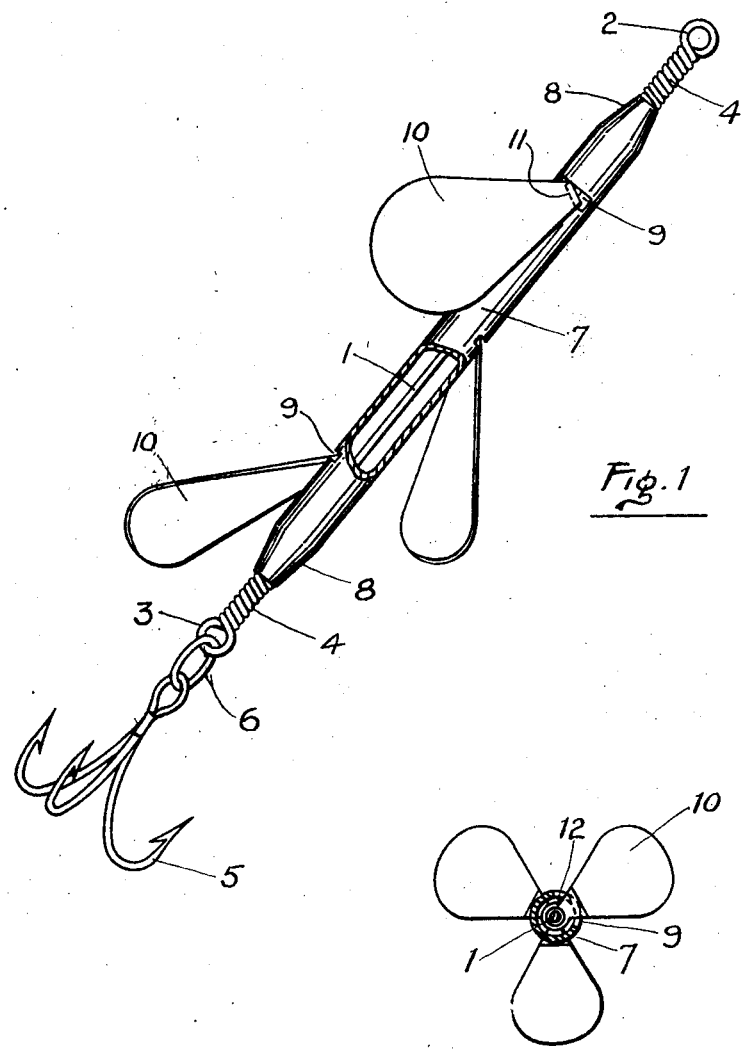
Fig. 1 is a general view of the invention.
Fig. 2 is a transverse sectional view of the stem showing the mounting of the sleeve and discs thereon.

The numeral 1 indicates a stem consisting of a length of wire, the ends of which are bent to form a pair of eyes indicated by the numerals 2 and 3 respectively, and are then coiled back upon itself to form a pair of collars 4. To the eye 3 a single or multiple fish hook 5 is attached by a ring 6, the eye 2 being adapted for attachment to a fish line. Freely mounted upon the stem 1 is a sleeve 7 which is preferably tapered at opposite ends as at 8 so as to give a substantially streamline form to the sleeve. At equidistant points about the periphery of the sleeve rectangular apertures 9 are formed, which are spaced at suitable intervals of its length.

The numeral 10 indicates generally a plurality of reflectors or discs which are preferably of metal, and coated or plated on one side to produce a variation of color between the sides. The discs may be of any shape, though I have found the pear shaped discs to be most suitable, and are bent substantially to a right angle adjacent their upper ends as at 11 and are each provided with an eye as at 12 through which the stem 1 freely passes, so that they are free to swing tangentially and radially of the axis of the lure within the limits prescribed by the rectangular apertures 9 in which their upper ends are housed.

Having thus described the several parts of my invention I will now briefly explain its functions.

As the lure is drawn through the water the resistance imposed upon the discs 10 causes them to swing at varying angles about the sleeve, producing at times a tendency to rotate in one direction, the tendencies of one vane being countered by opposite tendencies of others, so that an oscillating movement is produced, and complete rotation is almost entirely overcome. Through this oscillating movement of the discs a scintillation of the material of the discs is obtained which proves to have a great attraction to the fish.

What I claim as my invention is:

1. A fish lure comprising a stem supporting one or more hooks and being adapted for attachment to a fishing line, an apertured sleeve freely mounted upon the stem, and discs each having one end reduced, said reduced ends projecting inwards through the apertures of the sleeve and being freely mounted upon the stem whereby each disc is capable of independent limited radial movement and the discs and sleeve are collectively capable of complete radial movement about the stem.

2. A fish lure comprising a stem, a plurality of radially extending plates loosely mounted on said stem, a sleeve rotatably mounted on said stem and provided with slots receiving said plates therethrough, said sleeve serving to space the plates apart and having the slots therein made of sufficient size with reference to the portions of the plates passing therethrough as to permit limited independent movement of each plate about the stem.

3. A fish lure comprising a stem, radially extending plates loosely mounted upon said stem, means serving to retain said plates in proper spaced relation, said means being rotatably mounted on the stem and formed to provide stops restricting said plates to limited independent movement about said stem.

Dated at Tranquille, B. C., this 11th day of February, 1926.

JOHN FREDERICK WYRILL.